(12) United States Patent
Miller et al.

(10) Patent No.: US 8,465,879 B2
(45) Date of Patent: Jun. 18, 2013

(54) REINFORCED FUEL CELL METAL PLATE PERIMETER

(75) Inventors: Daniel P. Miller, Victor, NY (US);
Steven J. Spencer, Rochester, NY (US);
Robert Thompson, Lockport, NY (US);
Matthew J. Beutel, Webster, NY (US);
Siguang Xu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 12/938,847

(22) Filed: Nov. 3, 2010

(65) Prior Publication Data

US 2012/0107713 A1     May 3, 2012

(51) Int. Cl.
*H01M 8/02*     (2006.01)

(52) U.S. Cl.
USPC .......................................... 429/457; 429/518

(58) Field of Classification Search
USPC ................................................... 429/457, 518
See application file for complete search history.

(56) References Cited

U.S. PATENT DOCUMENTS

| 7,258,263 | B2 * | 8/2007 | Sigler et al. | 228/157 |
| 8,163,431 | B2 * | 4/2012 | Lemasson et al. | 429/457 |
| 2009/0239128 | A1 * | 9/2009 | Keyser et al. | 429/36 |

* cited by examiner

*Primary Examiner* — Stephen J. Kalafut
(74) *Attorney, Agent, or Firm* — Fraser Clemens Martin & Miller LLC; J. Douglas Miller

(57) ABSTRACT

A bipolar plate for a fuel cell includes a pair of plates. Each plate has an active area, a header area, and a perimeter area. The perimeter area is disposed adjacent an edge of the plate. The perimeter area is also disposed adjacent to each of the active area and the header area. At least one of the plates includes a raised support feature having an inboard side and an outboard side. The plates are joined in the perimeter area between the outboard side of the raised support feature and the edges of the plates.

20 Claims, 3 Drawing Sheets

REINFORCED FUEL CELL METAL PLATE PERIMETER

FIELD OF THE INVENTION

The present disclosure relates to a fuel cell and, more particularly, to a bipolar plate for the fuel cell.

BACKGROUND OF THE INVENTION

A fuel cell has been proposed as a clean, efficient, and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM), such as carbon fiber paper, which facilitates a delivery of reactants, such as hydrogen to the anode and oxygen to the cathode. An MEA and DM preassembled together with a subgasket for the separation of reactant fluids is known as a unitized electrode assembly (UEA).

In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

The electrolyte membrane is typically formed from a layer of ionomer. The electrodes of the fuel cell are generally formed from a finely-divided catalyst. The catalyst may be any electrocatalyst that catalytically supports at least one of an oxidation of hydrogen or methanol, and a reduction of oxygen for the fuel cell electrochemical reaction. The catalyst is typically a precious metal such as platinum or another platinum-group metal. The catalyst is generally disposed on a carbon support, such as carbon black particles, and is dispersed in an ionomer.

The electrolyte membrane, the electrodes, the DM, and a subgasket, for example, in the form of the UEA, are disposed between a pair of fuel cell plates. The pair of fuel cell plates constitutes an anode plate and a cathode plate. Each of the fuel cell plates may have a plurality of channels formed therein for distribution of the reactants and coolant to the fuel cell. The fuel cell plate is typically formed by a conventional process for shaping sheet metal such as stamping, machining, molding, or photo etching through a photolithographic mask, for example. In the case of a bipolar fuel cell plate, the fuel cell plate is typically formed from a pair of unipolar plates, which are then joined to form the bipolar fuel cell plate.

Known bipolar fuel cell plates have anode and cathode unipolar plates with substantially planar surfaces around the perimeters or edges of the plates. Typically, the unipolar plates are stamped from very thin metal sheets, for example, stainless steel sheets having a thickness of roughly 100 µm. The anode and cathode unipolar plates are also not welded together at the respective perimeters, and tend to splay apart. The bipolar fuel cell plates are undesirably subject to deformation of the edges of the unipolar plates due to poor handling and rough shipping. If the deformation is sufficiently large, the deformation results in a point load on the subgasket that separates adjacent fuel cells. The point load on the subgasket can cause cell-to-cell electrical shorting if the deformed edge pierces the subgasket and touches an adjacent bipolar fuel cell plate.

It has heretofore been known to use a plastic spacer frame that separates the perimeters of adjacent bipolar fuel cell plates in order to militate against cell-to-cell shorting, for example, as disclosed in U.S. patent application Ser. No. 12/859,343 to Miller et al. The known plastic spacer frame is heat sealed to the plate around the perimeter of the bipolar fuel cell plate, for example, by heat staking. This is just one possible method of assembly; a pressure sensitive adhesive (PSA), mechanical alignment, and loose laid configuration aligned over datum pins are other potential options. The thin metal sheets typically employed can make difficult the attaching of the plastic spacer frame to the bipolar fuel cell plates.

There is a continuing need for a fuel cell plate that militates against edge deformation and provides continuous supporting features for downstream process steps such as sealing and attaching the insulating spacer frame to the fuel cell plate.

SUMMARY OF THE INVENTION

In concordance with the instant disclosure, a fuel cell plate that militates against edge deformation and provides continuous supporting features for down stream process steps such as attaching the insulating spacer frame to the fuel cell plate, is surprisingly discovered.

In one embodiment, a bipolar plate for a fuel cell includes a pair of plates. Each plate has an active area, a header area, and a perimeter area. The perimeter area is disposed adjacent an edge of the plate. The perimeter area is also disposed adjacent to each of the active area and the header area. At least one of the plates includes a raised support feature having an inboard side and an outboard side. The plates are joined in the perimeter area between the outboard side of the raised support feature and the edges of the plates. In certain embodiments, the perimeter area can have a continuous form (raised) feature and utilize a continuous weld along the perimeter edge. The continuous form (raised) feature can also double as a sealing weld along this path.

In another embodiment, a fuel cell includes a unitized electrode assembly disposed between the bipolar plates. The unitized electrode assembly includes a subgasket and a membrane electrode assembly disposed between a pair of diffusion medium layers.

In a further embodiment, a fuel cell stack includes a plurality of the fuel cells arranged in a stack.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

Figure 1:
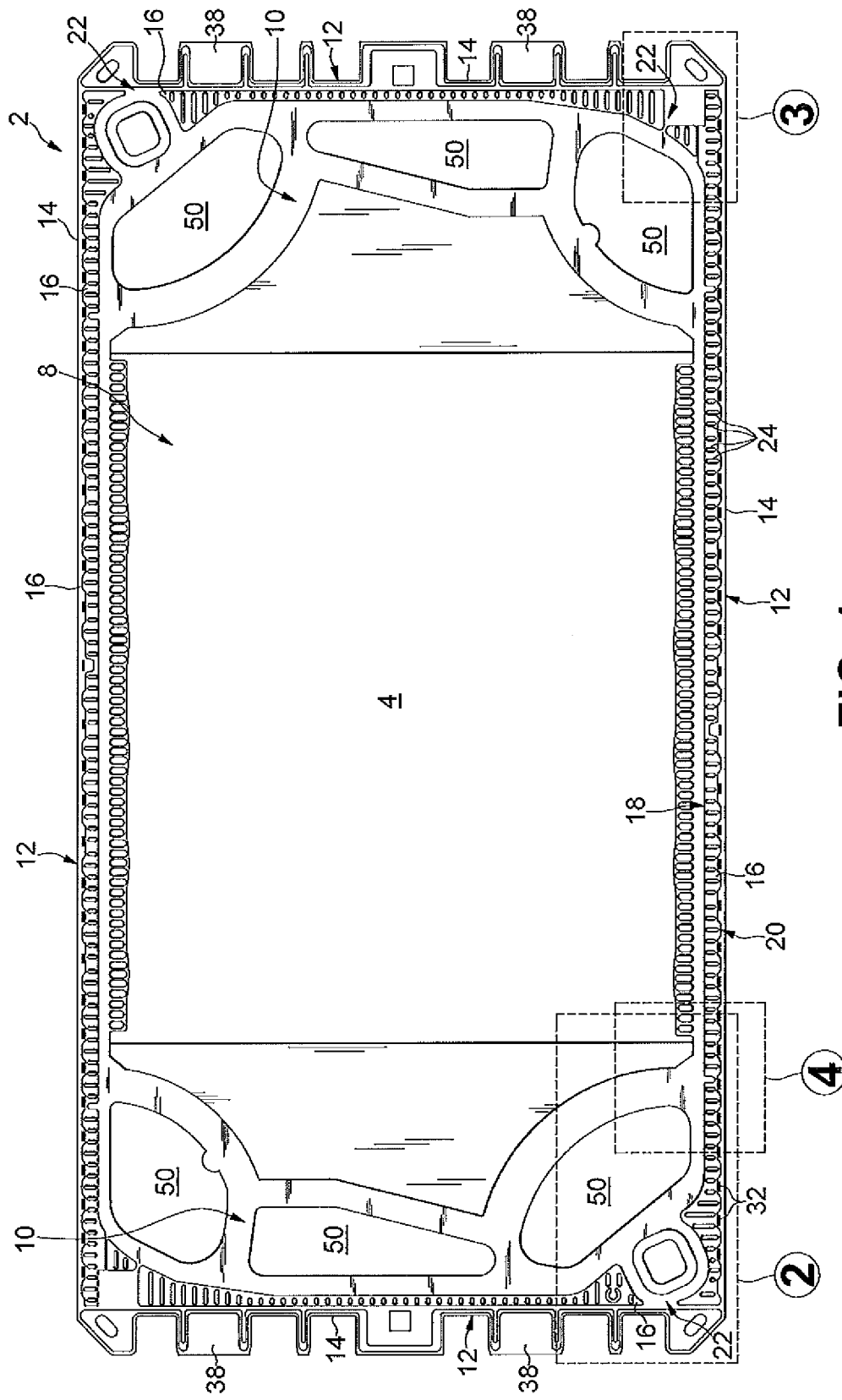
FIG. 1 is a top plan view of a bipolar fuel cell plate according to one embodiment of the present disclosure.

The following detailed description and appended drawings describe and illustrate various embodiments of the invention. The description and drawings serve to enable one skilled in the art to make and use the invention, and are not intended to limit the scope of the invention in any manner.

With reference to FIGS. 1-4, the present disclosure includes a bipolar plate 2 for a fuel cell stack (not shown). The bipolar plate 2 includes a pair of plates 4, 6 such as an anode unipolar plate and a cathode unipolar plate. Each plate 4, 6 has an active area 8, a header area 10, and a perimeter area 12. The perimeter area 12 is disposed adjacent an edge 14 of the plate 4, 6. The perimeter area 12 is also disposed adjacent each of the active area 8 and the header area 10. For example, the perimeter area 12 may substantially surround both of the active area 8 and the header area 10.

Figure 2:
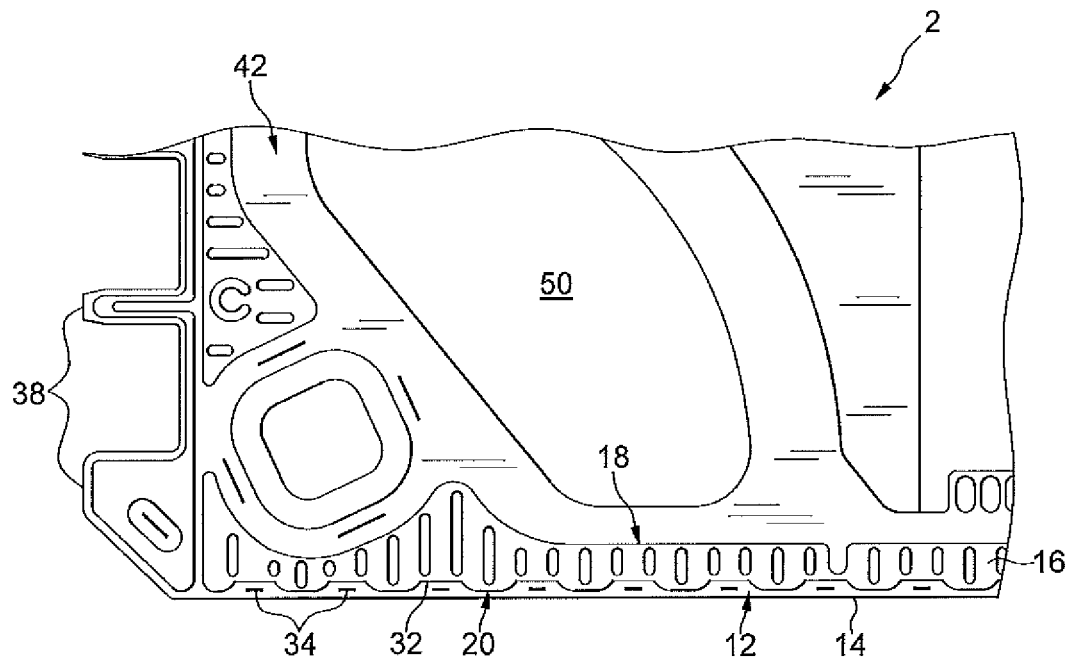
FIG. 2 is a an enlarged fragmentary top plan view of the bipolar plate identified by area 2 in FIG. 1.
Figure 3:
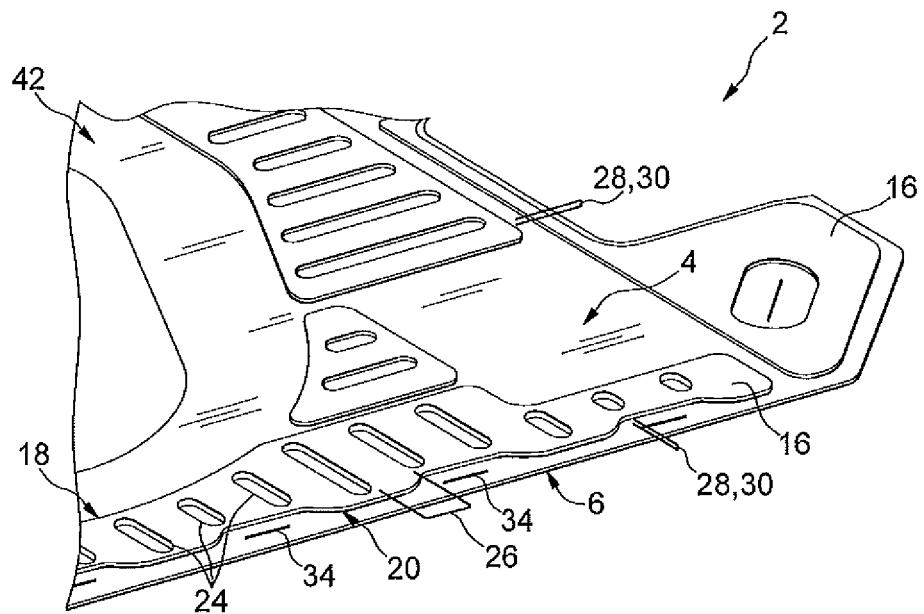
FIG. 3 is an enlarged fragmentary top perspective view of the bipolar plate identified by area 3 in FIG. 1.

The perimeter area 12 of at least one of the plates 4, 6 includes a raised support feature 16 having an inboard side 18 and an outboard side 20. The pair of plates 4, 6 are joined in the perimeter area 12 between the outboard side 20 of the raised support feature 16 and the edges 14 of the plates 4, 6. In a particular embodiment, the raised support feature 16 surrounds the active area 8 and the header area 10. The raised support feature 16 may be substantially continuous or include a plurality of intermittent breaks 22, for example, as shown in FIGS. 1-3. It should be appreciated that the breaks 22 may be provided to facilitate packaging of the bipolar plates 2 in the fuel cell stack. In one embodiment, the raised support feature 16 has a plurality of elongate slots 24, also known as dimples or depressions, formed therein. The elongate slots 24 do not extend completely to the inboard side 18 and the outboard side 20 of the raised support feature 16. The elongate slots 24 may be provided with any desired orientation. The elongate slots 24 may be oriented transverse to the orientation of the raised support feature 16, as one nonlimiting example. The elongate slots 24 advantageously permit one to select a specific stiffness and resistance to flexing of the raised support feature 16.

The elongate slots 24 are spaced apart from one another along the length of the raised support feature 16 at the edges 14 of the plates 4, 6. Spans 26 between each of the elongate slots 24 may be substantially the same or different, as desired. A width of each of the spans 26 is selected to minimize a deformation of the raised support feature 16, and thereby a deformation at the edges 14 of the plates 4, 6. As a nonlimiting example, the widths of the spans 26 may be selected to minimize deformation up to at least 150 psi.

A depth 28 of the elongate slots 24 and a height 30 of the raised support feature 16 may also be selected to provide the desired stiffness and resistance to flexing. In particular embodiments, the perimeter area 12 on each of the inboard side 18 and the outboard side 20 of the raised support feature 16 has a substantially planar surface. The depth 28 of each of the elongate slots 24 may extend to the planar surfaces of the perimeter area 12.

The height 30 of the raised support feature 16 is selected to provide sufficient support without providing an undesirable compressive load in the perimeter area 12 when a plurality of the bipolar plates 2 are arranged in a stack and compressed to form the fuel cell stack. The height 30 of the raised support feature 16 may be between about two (2) to about (4) times an average thickness of the plate 4, 6, for example. As a particular nonlimiting example, the average thickness of the plates 4, 6 is about 75 microns, the depth 28 of the elongate slots 24 reaches the substantially planar surface of the perimeter area 12, and the height 30 of the raised support feature 16 is between about 150 microns and about 300 microns. Other suitable orientations, span 26 widths, depths 28 of the elongate slots 24, and heights 30 of the raised support feature 16 may be selected, as desired.

The bipolar plate 2 of the present disclosure further includes a plurality of minor depressions 32 on the outboard side 20 of the raised support feature 16. The minor depressions 32 permit the joining of the plates 4, 6 by stitch welds 34. The stitch welds 34 may be formed by laser welding, as one nonlimiting example. Each stitch weld 34 is made in one of the minor depressions 32 between the outboard side 20 of the raised support feature 16 and the edge 14 of the plates 4, 6. The stitch welds 34 may be only disposed on a first side and an opposing second side of the bipolar plate 2, for example, as shown in FIG. 1. The edges 14 of the plates 4, 6 are thereby secured together, militating against a splaying of the edges 14 during handling of the bipolar plate 2 and manufacturing of the fuel cell stack. Alternate designs could use a continuous weld or other pattern along the perimeter of the plate edges 14.

The bipolar plate 2 of the present disclosure may also include a plurality of outwardly extending tabs 38. The outwardly extending tabs 38 may be formed at the perimeter area 12 at each of a first end and a second end of the bipolar plate 2, for example, as shown in FIG. 1. The raised support feature 16 is at least partially formed on the outwardly extending tabs 38. This serves to strengthen the tabs and hold them in proper alignment. The outwardly extending tabs 38 may serve as sensing connection points connectors in electrical communication with extraneous equipment for monitoring the performance of the fuel cell stack.

Figure 4:
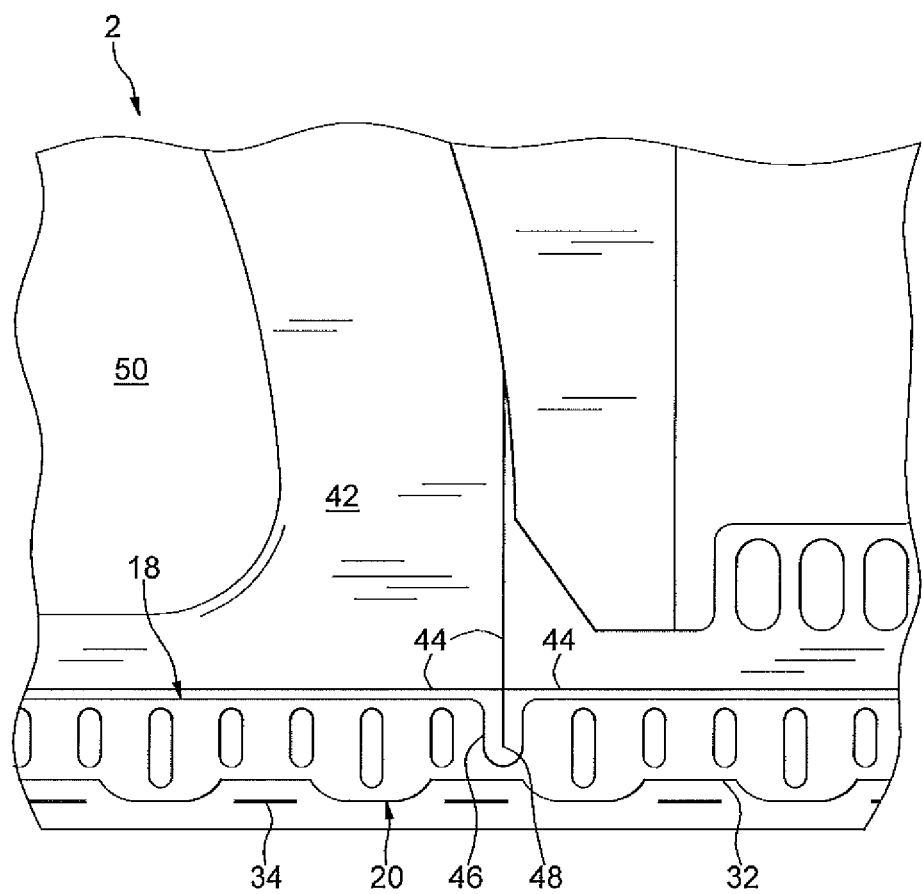
FIG. 4 is an enlarged fragmentary top plan view of the bipolar plate identified by area 4 in FIG. 1.

Referring now to FIG. 4, the inboard side 18 of the raised support feature 16 is disposed adjacent a sealing gland 42 of the bipolar plate 2. A sealing weld 44 is formed inboard of the raised support feature 16 in the sealing gland 42. The sealing weld 44 provides a hermetic seal between the anode, the cathode, and the coolant fluids of the fuel cell stack during operation. The raised support feature 16 includes a welding depression 46 on the inboard side 18 of the raised support feature 16. The sealing weld 44 terminates in the welding depression 46 in the perimeter area 12 at a terminal end 48. It is known that the terminal end 48 of welds, and particularly laser welds, can undesirably result in a pinhole in the welded material. The welding depression 46 permits the terminal end 48 of the sealing weld 44 to be placed outside of the sealing gland 42. The welding depression 46 thereby militates against a leakage of the anode, cathode, or coolant fluids in operation.

Depending on the position of the hermetic seal, the crossing weld termination 48 may be located inside of the inboard edge of the raised support feature 16. It should be appreciated that the weld depression 46 integration into the raised support feature 16 permits the plate size to be smaller and enables the hermetic sealing weld 44 to be biased outward toward the raised support feature 16.

With renewed reference to FIGS. 1-2, the bipolar plate 2 of the disclosure includes a plurality of manifold apertures 50. A shape the inboard side 18 of the raised support feature 16 may substantially conform to edge shapes of the manifold apertures 50 disposed adjacent the raised support feature 16. Other shapes of the inboard side 18 of the raised support feature 16 may also be employed, as desired.

A pair of the bipolar plates 2 according to the present disclosure is employed to form a fuel cell. The fuel cell may include a unitized electrode assembly (not shown) having a subgasket and a membrane electrode assembly disposed between a pair of diffusion medium layers. The membrane electrode assembly and the diffusion medium layers are disposed between the bipolar plates 2 to form the fuel cell. A plurality of the fuel cells may be arranged in a stack to form the fuel cell stack of the present disclosure.

Advantageously, the perimeter area 12 of the bipolar plate 2 is made stronger and stiffer by employing the raised support feature 16 around substantially the entire perimeter of the bipolar plate 2. The raised support feature 16, as shown herein, permits the anode and cathode plate 4, 6 to be welded together at the respective edges 14 thereof. The welding creates a stronger edge 14 and militates against the plate 4, 6 splaying apart when deformed, which is known to cause electrical shorting to adjacent cells. Bringing the anode and cathode plates 4, 6 together also creates a larger gap between adjacent plates, thereby reducing the risk of bipolar plate 2 deformations touching adjacent bipolar plates 2, and potentially causing electrical shorts. The stiffer perimeter area 12 also provides a rigid surface for holding the anode and cathode unipolars flat during the joining process to form a bipolar plate 2. The rigid surface is also used to hold the bipolar plate 2 flat during cure-in-place (CIP) seal addition processes.

It should also be appreciated that the raised support feature 16 can be used to support an insulative spacer frame, for example, as disclosed in U.S. patent application Ser. No. 12/859,343 to Miller et al., during a cell integration process. This process involves applying heat and pressure to a subgasket with ethyl vinyl acetate (EVA) that overlaps the spacer frame. Advantageously, the raised support feature 16 around the perimeter of the bipolar plate 2 withstands the pressures and stresses applied during the cell integration process.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bipolar plate for a fuel cell, comprising:
a pair of plates, each plate having an active area, a header area, and a perimeter area, the perimeter area disposed adjacent an edge of the plate and each of the active area and the header area, the perimeter area of at least one of the plates includes a raised support feature having an inboard side and an outboard side, wherein the raised support feature includes a plurality of elongate dimples formed therein, the pair of plates joined in the perimeter area between the outboard side of the raised support feature and the edges of the plates.

2. The bipolar plate of claim 1, wherein the raised support feature surrounds the active area and the header area.

3. The bipolar plate of claim 2, wherein the raised support feature includes a plurality of intermittent breaks.

4. The bipolar plate of claim 1, wherein the elongate dimples are oriented transverse to an orientation of the raised support feature.

5. The bipolar plate of claim 1, wherein the perimeter area on each of the inboard side and the outboard side of the raised support feature has a substantially planar surface.

6. The bipolar plate of claim 5, wherein a depth of each of the elongate dimple extends to the planar surface of the perimeter area.

7. The bipolar plate of claim 1, wherein the raised support feature includes a plurality of minor depressions on the outboard side of the raised support feature.

8. The bipolar plate of claim 7, wherein the pair of plates is joined by stitch welds in the minor depressions on the outboard side of the raised support feature.

9. The bipolar plate of claim 7, wherein the pair of plates are joined together by a weld along the outboard side of the raised support features.

10. The bipolar plate of claim 1, wherein the perimeter area of each of the plates includes a plurality of outwardly extending tabs, the raised support feature at least partially formed on the outwardly extending tabs.

11. The bipolar plate of claim 10, wherein the outwardly extending tabs are sensor interconnections.

12. The bipolar plate of claim 1, wherein the inboard side of the raised support feature includes a welding depression.

13. The bipolar plate of claim 12, wherein the pair of plates has a sealing weld inboard of the raised support feature to provide a hermetic seal between the anode, the cathode, and the coolant fluids, the sealing weld terminating in the welding depression in the perimeter area, the welding depression militating against a leakage caused by the termination of the seal weld.

14. The bipolar plate of claim 1, wherein a height of the raised support feature is between about two (2) to about (4) times an average thickness of the plate.

15. The bipolar plate of claim 14, wherein the average thickness of one of the plates is about 75 microns and the height of the raised support feature is between about 150 microns and about 300 microns.

16. The bipolar plate of claim 1, wherein the pair of plates include a plurality of manifold apertures, a shape the inboard side of the raised support feature conforming to edge shapes of the manifold apertures adjacent the raised support feature.

17. A fuel cell, comprising:
a pair of bipolar plates, each bipolar plate including pair of plates, each plate having an active area, a header area, and a perimeter area, the perimeter area disposed adjacent an edge of the plate and each of the active area and the header area, the perimeter area of at least one of the plates includes a raised support feature having an inboard side and an outboard side, wherein the raised support feature includes a plurality of elongate dimples formed therein, the pair of plates joined in the perimeter area between the outboard side of the raised support feature and the edges of the plates; and
a unitized electrode assembly including a subgasket and a membrane electrode assembly disposed between a pair of diffusion medium layers, the membrane electrode assembly and the diffusion medium layers disposed between the bipolar plates.

18. A bipolar plate for a fuel cell, comprising:
a pair of plates, each plate having an active area, a header area, and a perimeter area, the perimeter area disposed adjacent an edge of the plate and each of the active area and the header area, the perimeter area of at least one of the plates includes a raised support feature having an inboard side and an outboard side, the raised support feature surrounds the active area and the header area, wherein the raised support feature includes a plurality of intermittent breaks, the pair of plates joined in the perimeter area between the outboard side of the raised support feature and the edges of the plates.

19. The bipolar plate of claim 18, wherein the raised support feature includes a plurality of minor depressions on the outboard side of the raised support feature, wherein the pair of plates is joined by one of stitch welds in the minor depressions on the outboard side of the raised support feature and a continuous weld along the outboard side of the raised support features.

20. The bipolar plate of claim 18, wherein the perimeter area of each of the plates includes a plurality of outwardly extending tabs, the raised support feature at least partially formed on the outwardly extending tabs, wherein the outwardly extending tabs are sensor interconnections.

\* \* \* \* \*